United States Patent
Kuzuya et al.

(10) Patent No.: US 7,055,406 B1
(45) Date of Patent: Jun. 6, 2006

(54) AXLE HOUSING ASSEMBLY

(75) Inventors: Mamoru Kuzuya, Aichi-ken (JP); Hideaki Shima, Aichi-ken (JP); Masayasu Arakawa, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 09/379,651

(22) Filed: Aug. 24, 1999

(30) Foreign Application Priority Data

Aug. 26, 1998 (JP) .................. 10-240377

(51) Int. Cl.
*F16H 57/05* (2006.01)

(52) U.S. Cl. ..................... 74/607; 74/606 R

(58) Field of Classification Search .................. 74/607, 74/606 R; 180/352, 378, 375, 360
See application file for complete search history.

(56) References Cited

U.S. PATENT DOCUMENTS

| | | | | |
|---|---|---|---|---|
| 863,604 A | * | 8/1907 | Herzog | 74/607 X |
| 2,570,191 A | * | 10/1951 | Beckwith | 180/344 |
| 4,432,428 A | * | 2/1984 | Kondo et al. | 180/360 |
| 5,175,665 A | * | 12/1992 | Pegg | |
| 5,644,955 A | * | 7/1997 | Yamamoto | 74/607 |
| 6,257,090 B1 | * | 7/2001 | Arakawa et al. | 74/607 |

FOREIGN PATENT DOCUMENTS

| | | | | |
|---|---|---|---|---|
| DE | 29 06 708 A1 | | 9/1980 | |
| DE | 4220629 | * | 4/1993 | 74/607 |
| JP | 59-040901 | | 3/1984 | |
| JP | 2-8803 | | 3/1990 | |
| JP | 05-169906 | | 7/1993 | |
| JP | 9-290652 | | 11/1997 | |

\* cited by examiner

*Primary Examiner*—Vicky A. Johnson
(74) *Attorney, Agent, or Firm*—Morgan & Finnegan, LLP

(57) ABSTRACT

An axle housing support structure may readily assemble and support an axle housing to a base frame. In the axle housing support structure, the axle housing composed of a differential housing with a body and a pair of axle tubes mounted on right and left sides of the differential housing for receiving a front axle is supported by fixing axle brackets fitted to the axle tubes, respectively, to the base frame. The axle bracket is fastened by using a repulsive force receiving bolt to a repulsive force receiving portion formed integrally with the body of the differential housing.

11 Claims, 3 Drawing Sheets

AXLE HOUSING ASSEMBLY

BACKGROUND OF THE INVENTION

The present invention relates to an axle housing assembly for receiving a drive axle for an industrial vehicle such as a forklift or the like, and more particularly to a support structure for supporting an axle housing against a drive repulsive force.

DESCRIPTION OF THE RELATED ART

In a forklift, usually, front wheels are drive wheels, and a front axle for transmitting a drive force to the front wheels and a differential gear are received in the axle housing. As shown in FIG. 3, a conventional general axle housing 1 is composed of a differential housing 2 and axle tubes 4 connected, respectively, to right and left opening portions 3 of the differential housing 2 for receiving a front axle. The differential gear is supported by a differential carrier 5. The differential carrier 5 is fastened by bolts to a rear opening portion of the differential housing 2. Furthermore, a rear cover 6 is fastened by bolts to the rear side of the differential carrier 5. Also, the axle housing 1 is supported to a base frame 8 by fastening, by bolts, axle brackets 7 fitted to each axle tube 4 to side members 9 of the base frame 8.

A type in which the axle housing 1 is separated from an engine portion in order to suppress transmission of vibrations from the engine portion (including a transmission) becomes popular. In such a separation type axle housing 1, in order to resist the drive repulsive force generated during a starting operation, a braking operation or the like, the axle brackets 7 are fixed by repulsive force receiving bolts 11 to repulsive force receiving portions 10 formed in the rear cover 6.

In order to couple the axle brackets 7 and the repulsive force receiving portions 10 of the rear cover 6 with each other by the bolts 11, it is necessary to enhance the dimensional precision of the axle brackets 7, the axle tubes 4, the differential housing 2, the differential carrier 5 and the rear cover 6 as well as the assembling precision thereamong and to align screw holes 12 formed in the repulsive force receiving portions 10 of the rear cover 6 and through holes 13 formed in the axle brackets 7 in a coaxial manner.

However, these components are cast products. Accordingly, there is a problem that it is difficult to significantly enhance the dimensional precision. Also, since the number of the components is large, a problem arises in which, as a result of accumulation of tolerance, an axis of the screw hole 12 of the rear cover 6 is displaced with respect to an axis of the through hole 13 of the axle bracket 7. Accordingly, it is troublesome to manufacture the axle housing 1 and assemble the component to the base frame 8, resulting in increased cost.

Also, in order to ensure the coupling by the bolts 11, it is necessary to bring the axle brackets 7 into contact with the repulsive force receiving portions 10. However, in the case where the right and left axle brackets 7 are fixed to the corresponding side members 9 of the base frame 8 as in the above-described conventional structure, in many cases, a gap occurs between the axle brackets 7 and the repulsive force receiving portions 10. Thus, it requires a troublesome shim adjustment.

SUMMARY OF THE INVENTION

In view of the above-noted defects, an object of the present invention is to provide an axle housing assembly that allows an axle housing to be mounted to a base frame with ease while supporting the axle housing thereon without requiring significantly greater dimensional precision.

In order to attain the above-mentioned object, according to the present invention, there is provided an axle housing assembly comprising an axle housing having a differential housing with a body thereof and a pair of axle tubes mounted on the body, a support means for supporting the axle housing to a base frame and a repulsive force receiving member provided on the body of the differential housing for coupling the differential housing integrally with the support means.

DESCRIPTION OF THE PREFERRED EMBODIMENT

A preferred embodiment of the present invention will now be described in detail with reference to FIGS. 1 and 2.

Figure 1:
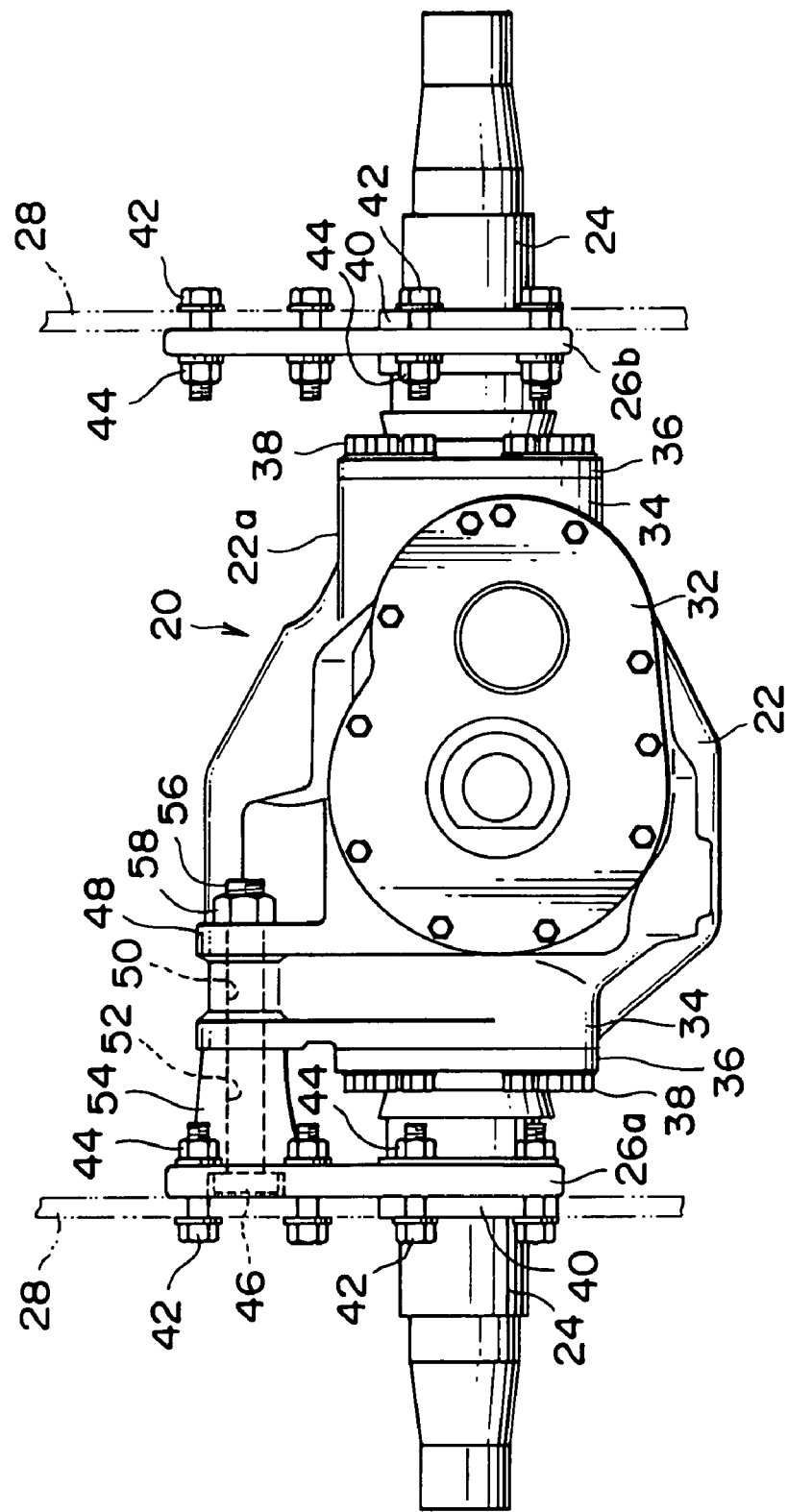
FIG. 1 is a frontal view showing an axle housing assembly according to the present invention.
Figure 2:
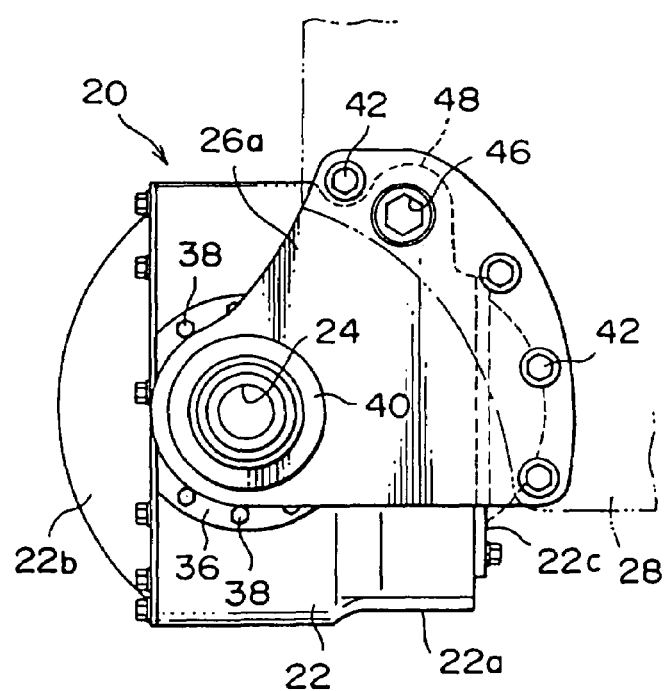
FIG. 2 is a left side elevational view showing the axle housing assembly shown in FIG. 1.
Figure 3:
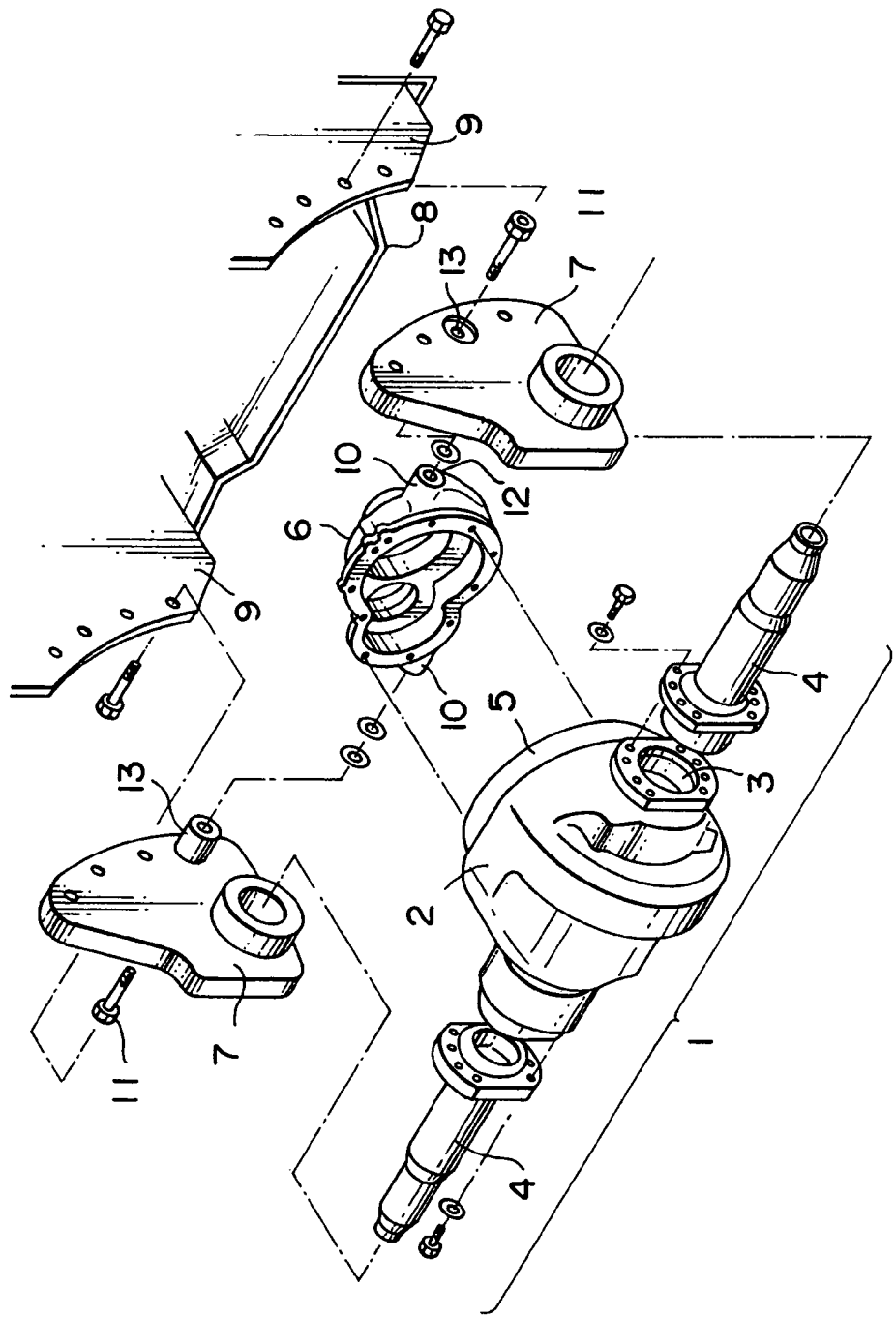
FIG. 3 is an exploded perspective view showing a conventional axle housing assembly.

In FIG. 1, an axle housing 20 is of a type which is separated away from an engine portion, and is provided with a differential housing 22 receiving a differential gear (not shown) and axle tubes 24 extending on the right and left of a body 22a of the differential housing 22. Axle brackets 26a and 26b are mounted on the axle tubes 24. The axle brackets 26a and 26b are fastened to corresponding side members 28 of a base frame by bolts so that the axle housing 20 is supported to the base frame.

The shown differential housing 22 in accordance with the embodiment is of a type in which the differential carrier for carrying the differential gear is integrally molded. A front cover 22b mounted on a front opening portion of the body 22a is removed, and gears constituting the differential gear may be assembled through the opening portion. Also, a rear opening portion is formed in the body 22a of the differential housing 22. A rear cover 22c for closing this opening portion is fastened to the rear portion of the body 22a by bolts.

A circular opening portion is formed in each of the right and left sides of the differential housing 22. A front axle (not shown) which is a drive axle connected to the differential gear within the differential housing 22 extends through the opening portion sideways. A boss 34 is formed on the periphery of each opening portion. A plurality of screw holes for coupling the corresponding axle tube 24 are formed in each boss 34.

Within each axle tube 24, the front axle is disposed coaxially with the axle tube. A proximal end portion of each axle tube 24 is fitted to the corresponding opening portion of the differential housing 22 in a shrink fit manner. Also, a flange 36 projects at a position away from the proximal end at a predetermined distance on the circumferential surface of each axle tube 24. A plurality of through holes are formed in each flange 36 corresponding to the screw holes of the boss 34.

In the case where such an axle tube 24 is coupled with the differential housing 22, the proximal end portion of the axle tube 24 is inserted into the corresponding opening portion of the differential housing 22, the through holes of the flange 36 are aligned with the corresponding screw holes of the boss 34, and the axle tube 24 is pressingly inserted until the flange 36 comes into contact with the boss 34. Thus, the bolts 38 are screwed into the screw holes through the through holes so that each axle tube 24 is fixed to the differential housing 22 to assemble the axle housing 20.

Each of the axle brackets 26a and 26b is a substantially fan-shaped vertical plate with its proximal portion being formed integrally with a ring portion 40. An inner diameter of the proximal ring portion 40 is substantially identical to an outer diameter of the axle tube 24 so that the axle tube 24 is slidably inserted into the proximal ring portion. A plurality of through holes is formed in the arcuate circumferential portion of each of the axle brackets 26a and 26b. These through holes correspond, in number, to the through holes formed in the front edge portion of the side member 28 of the base frame. The axle housing 20 is arranged at a suitable support position to the base frame, so that the through holes of the axle brackets are positioned to be aligned with the corresponding through holes of the side members 28. Accordingly, the through holes of the axle brackets 26a and 26b and the through holes of the side members 28 are aligned with each other and the bolts 42 are passed through with nuts 44 so that the axle brackets 26a and 26b are fixed to the side members 28 and the axle housing 20 are supported to the base frame.

Thus, the axle housing 20 supported to the base frame is subjected to the drive repulsive force upon starting, braking or the like of the forklift and tends to be rotated back and forth about the axis of the proximal ring portion 40 of each of the axle brackets 26a and 26b. For this reason, in the embodiment shown, one of the axle brackets (axle bracket on the left side in the forward traveling direction of the vehicle) 26a is coupled with the body 22a of the differential housing 22 by using a repulsive force receiving bolt 46.

More specifically, a convex portion repulsive force receiving portion 48 is formed integrally with and extends from an upper portion of the left side of the body 22a. In the repulsive force receiving portion 48, a through hole 50 is formed in parallel with the axle tubes 24 for receiving the repulsive force receiving bolt 46. Also, a through hole 52 through which the repulsive force receiving bolt 46 passes is formed in the axle bracket 26a. The through hole 52 is positioned to be aligned coaxially with the through hole 50 of the repulsive force receiving portion 48 under the condition that the axle housing 20 is located at a predetermined position to the base frame and supported by the axle brackets 26a and 26b. The through hole 52 passes through a thick portion 54 projected on the right side surface of the axle bracket 26a. The thick portion 54 has such a dimension that its distal end face is in contact with the left side surface of the repulsive force receiving portion 48 under the condition that the axle bracket 26a is suitably located at the axle housing 20.

The stem portion of the repulsive force receiving bolt 46 is caused to pass through the through hole 52 of the axle bracket 26a and the through hole 50 of the repulsive force receiving portion, or member, 48 and a nut 58 is screwed to the screw portion 56 projecting from the through hole 50. Thus, the axle bracket 26a and the repulsive force receiving member 48 are fastened between the head portion of the repulsive force receiving bolt 46 and the nut 58. Since the axle bracket 26a is fixed to the side member 28 of the base frame, in the case where the drive repulsive force occurs for rotating the axle housing 20 back and forth, the drive repulsive force received by the repulsive force receiving member 48 on the differential housing 22 and the repulsive force receiving bolt 46 supported by the axle bracket 26a so that the rotation of the axle housing 20 is prevented.

In the above-described arrangement, the assembling order of the axle housing 20 to the side members 28 of the base frame will now be described. The assembling work of the front axle and the differential gear into the axle housing 20 and the coupling work between the engine portion and the differential gear which are carried out together with the assembling work of the axle housing 20 are substantially the same as those of the conventional structure. Accordingly, the detailed explanation thereof will be omitted herein.

First of all, in order to assemble the axle housing 20, as described above, the proximal portions of the axle tubes 24 are inserted into the right and left opening portions of the differential housing 22, respectively, and fixed by bolts. Subsequently, the proximal ring portions 40 of the axle brackets 26a and 26b corresponding to the respective axle tubes 24 are fitted.

Thereafter, the through hole 52 of the axle bracket 26a and the through hole 50 of the repulsive force receiving portion 48 of the differential housing 22 are aligned with each other. Since the restriction of the positional relationship between the through holes 50 and 52 is performed only by three components, i.e., the axle bracket 26a, the axle tube 24 and the body 22a of the differential housing 22, the displacement caused by the accumulation of tolerance is small and the through holes 50 and 52 may be aligned exactly with each other without needs of the significant dimensional precision.

Subsequently, the repulsive force receiving bolt 46 is caused to pass through these through holes 50 and 52, and the nut 58 is screwed around the bolt 46 to thereby fasten the axle bracket 26a and the repulsive force receiving portion 48 with each other. In the conventional case, in order to fasten both the right and left axle brackets with the right and left repulsive receiving portions, after tentatively fixing the repulsive force receiving portions and the axle brackets with each other, the axle brackets are fixed to the base frame. It is necessary to check whether any gap is formed between the repulsive force receiving portions and the axle brackets or not. Then, the axle bracket is removed away from the base frame, the shim adjustment is performed if necessary, and the repulsive force receiving bolt is fastened. In contrast, in the embodiment shown, since only one of the axle brackets 26a is fixed to the repulsive force receiving portion 48 of the differential housing 22, there is no problem in the gap of the side member 28 of the base frame. Before the axle brackets 26a and 26b are fixed to the side members 28, it is possible to fasten the repulsive force receiving bolt 46 and the nut 58 with a sufficient torque.

Of course, in the case where a gap is formed between the thick portion 54 of the axle bracket 26a and the repulsive force receiving portion 48 due to the manufacturing error or the like of the axle bracket 26a, the shim adjustment is to be performed. However, unlike the conventional case, since the shim adjustment may be performed before the assembling work of the axle brackets 26a and 26b to the side members 28 of the base frame, this work is facilitated.

After the axle brackets 26a and the repulsive force receiving portion 48 are coupled with each other by the repulsive force receiving bolt 46, in the same manner as in the conventional case, the right and left axle brackets 26a and 26b are fixed to the corresponding side members 28 of the base frame by the bolts 42 and the nuts 44, thereby completing the assembling work.

Incidentally, after the axle brackets 26a and 26b are fixed to the base frame, the head portion of the repulsive force receiving bolt 46 is covered by a brake drum (not shown). Accordingly, it is impossible to rotate this bolt by clamping the bolt head portion by a wrench or the like. However, in the embodiment shown, since the nut 58 is exposed above the differential housing 22, it is possible to rotate it by the wrench. Accordingly, in the maintenance or after the assembling work, it is possible to perform the adjustment of the refastening work of the repulsive force receiving bolt 46.

As described above, the preferred embodiment of the present invention has been fully explained. It goes without saying that the present invention is not limited to the above-described embodiment. For example, in the above-described embodiment, the differential housing 22 is formed integrally with the differential carrier, but it is possible to apply the present invention even if the differential housing and the differential carrier are discrete members.

Also, since the axle bracket 26a may be firmly coupled with the repulsive force receiving portion 48 before assembling the axle housing 10 to the base frame, the through hole 50 of the repulsive force receiving portion 48 is replaced by a screw hole and at the same time, the nut 58 is dispensed with so that the repulsive force receiving bolt 46 may be threaded with the screw hole.

Furthermore, the present invention may be applied to any industrial vehicles other than the forklift, and for example, may be applied to a shovel loader or the like.

As described above, according to the present invention, the axle housing may readily be assembled into the base frame to be supported without the need for significant dimensional precision. Accordingly, it is possible to manufacture the axle housing or the base frame with ease and at low cost.

What is claimed is:

1. An axle housing assembly capable of being supported by a vehicle's base frame comprising:
    an axle housing having a differential housing and a cover attached to the differential housing, said differential housing having an integrally formed housing body and being provided with a pair of axle tubes fixed to said differential housing within said housing body;
    support means including a pair of axle brackets each having a ring portion wherein said pair of axle brackets are fitted on said pair of axle tubes adapted for mounting said axle housing to the base frame by coupling each axle bracket to the base frame wherein a thick portion projecting toward said housing body is formed on one of said pair of axle brackets such that the distal end of said thick portion is in contact with one of the left side surface and the right side surface of a convex repulsive force receiving member; and
    said convex repulsive force receiving member provided on the body of said differential housing wherein a through hole is formed in parallel with the axle tubes for receiving a fastener for directly coupling the body of said differential housing integrally with an axle bracket, wherein
    said differential housing is substantially centered between said pair of axle brackets, and wherein said convex repulsive force receiving member is secured to only one of said pair of axle brackets by a repulsive force receiving bolt so that said body is supported by the base frame through the brackets.

2. An axle housing assembly according to claim 1, wherein said axle cover is detachably mounted on said body.

3. An axle housing assembly according to claim 1, wherein said convex repulsive force receiving member further includes a portion integrally formed on said body,
    said repulsive force receiving bolt being caused to pass through said thick portion and said portion of said convex repulsive force receiving member.

4. An axle housing assembly according to claim 1, further comprising a nut for threadedly engaging with an end portion of said repulsive force receiving bolt,
    said nut being located in an upper portion of said differential housing.

5. An axle housing assembly capable of being supported by a vehicle's base frame comprising:
    an axle housing having a differential housing and a cover attached to the differential housing, said differential housing having an integrally formed housing body and being provided with a pair of axle tubes fixed to said differential housing within said housing body;
    support brackets each having a ring portion wherein said support brackets are fitted on said pair of axle tubes for supporting said axle housing on the base frame by coupling each axle bracket to the base frame; and
    a convex repulsive force receiving member extending generally vertically from the body of said differential housing wherein a through hole is formed in parallel with the axle tubes for receiving a fastener for coupling the body of said differential housing integrally with only one of said support brackets wherein a thick portion projecting toward said housing body is formed on one of said pair of axle brackets such that the distal end of said thick portion is in contact with the left side surface of the convex repulsive force receiving member, said fastener extending through said through hole and securing together the convex repulsive force receiving member and said one support bracket, wherein
    said differential housing is substantially centered between said support brackets.

6. An axle housing assembly according to claim 5, wherein the fastener is a bolt.

7. An axle housing assembly according to claim 6, further comprising a nut for threadedly engaging with an end portion of said bolt; said nut being located in an upper portion of said differential housing.

8. An axle housing assembly according to claim 6, wherein said one support bracket has a recess surrounding the through hole for recessing the head of said bolt.

9. An axle housing assembly according to claim 5, wherein the adjacent surfaces of the said one support bracket and said convex force receiving member are in abutment when fastened.

10. An axle housing assembly according to claim 5, wherein said one support bracket includes a generally vertical plate and said convex force receiving member extends vertically from the body of said housing.

11. The axle housing assembly of claim 5, wherein the convex force receiving member is formed integrally with the housing.

\* \* \* \* \*